United States Patent Office 3,486,109
Patented Dec. 23, 1969

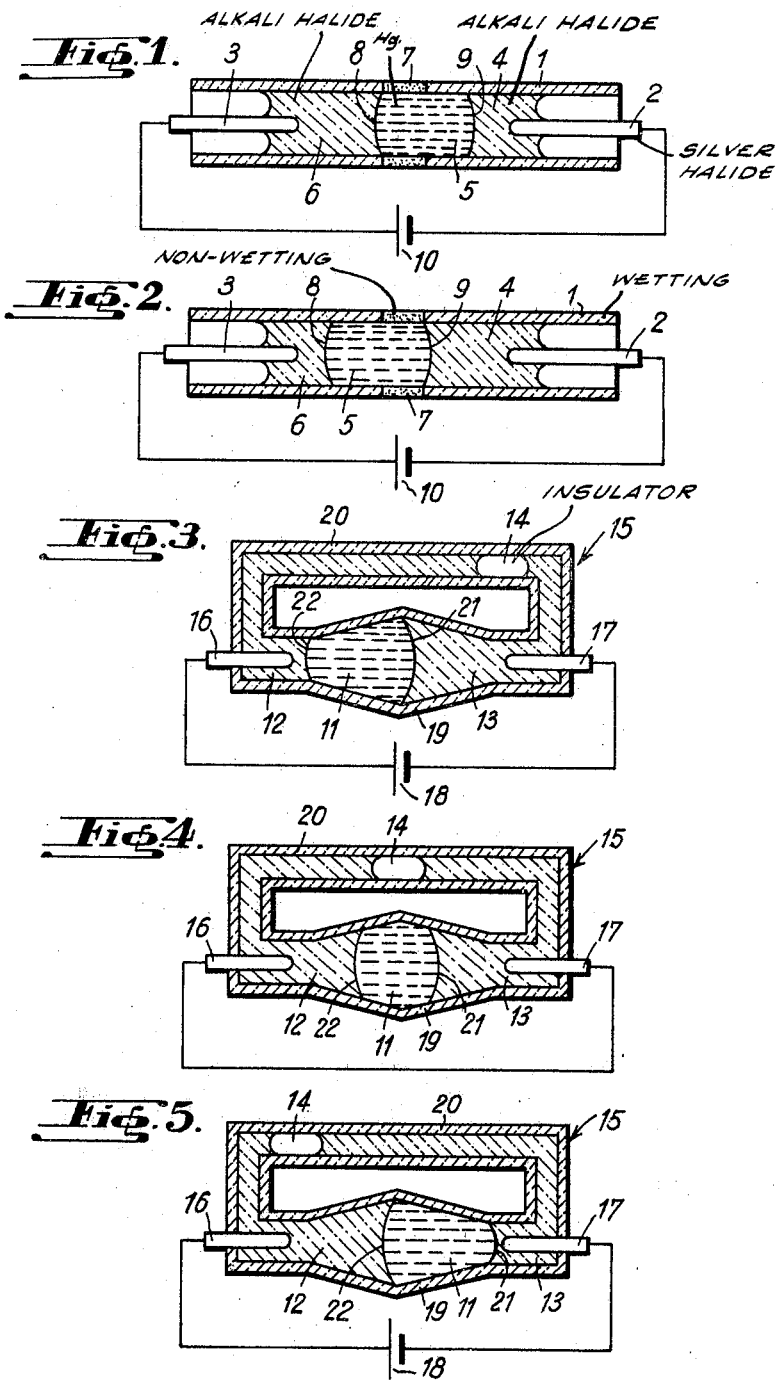

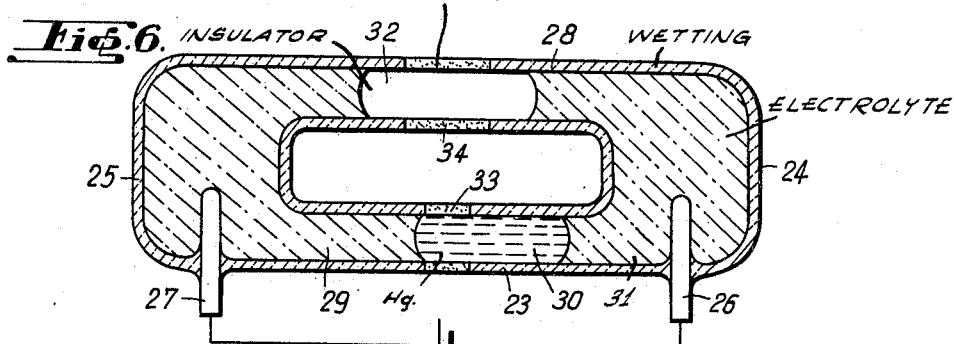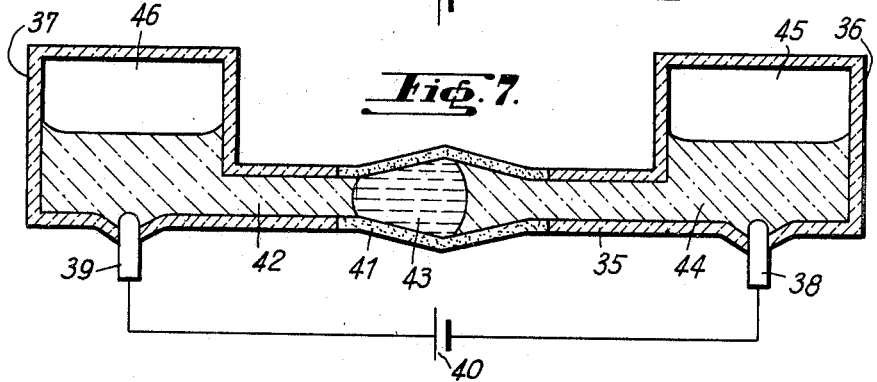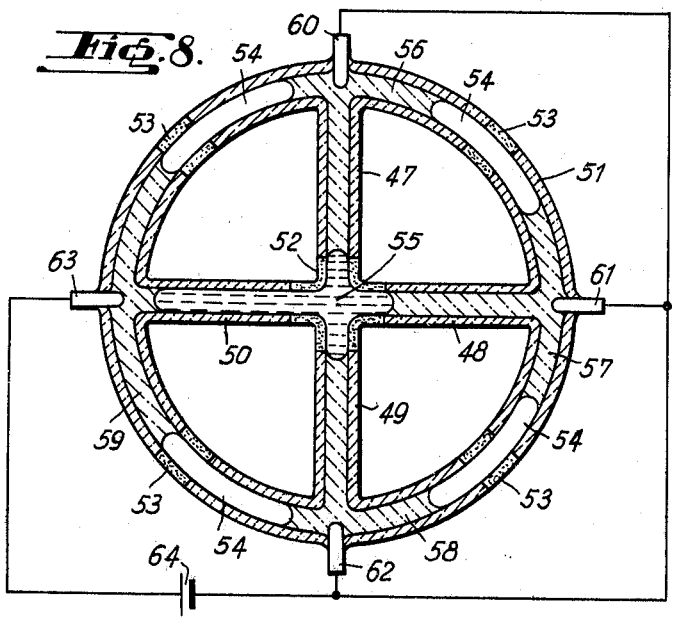

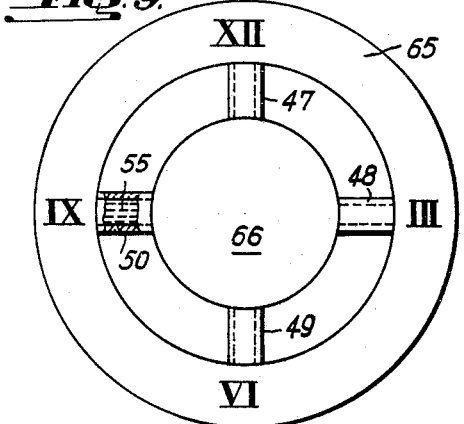
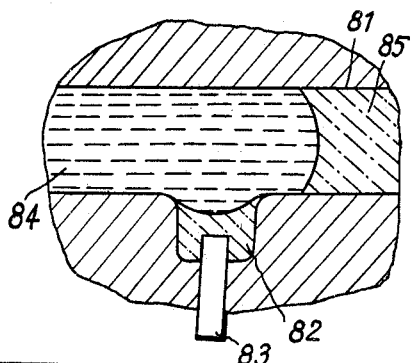
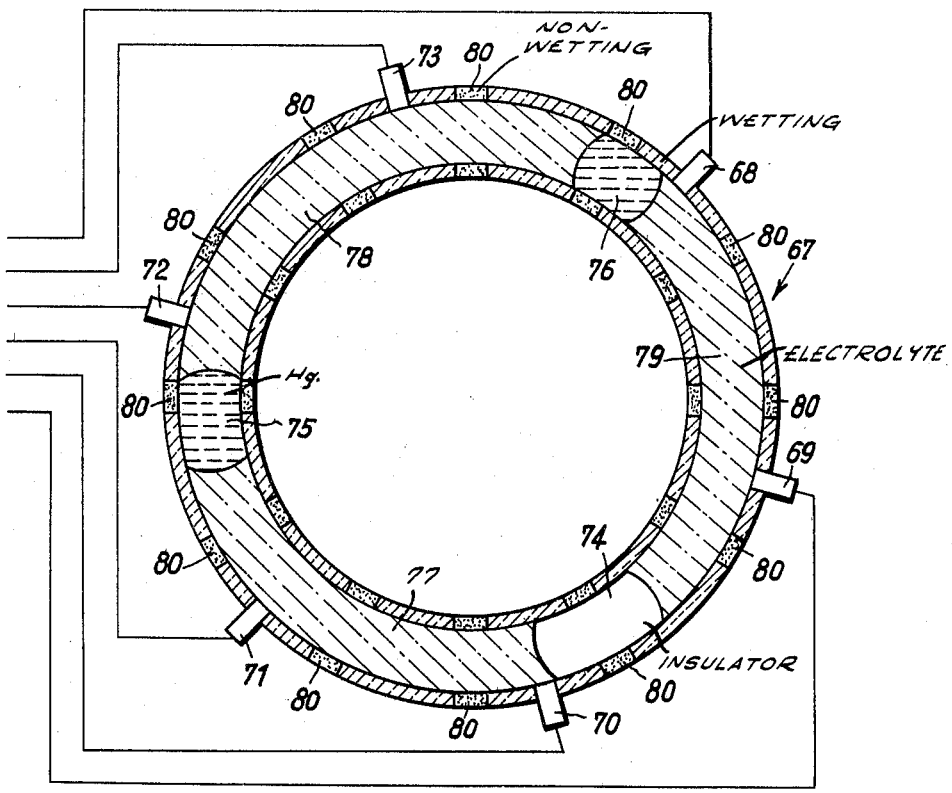

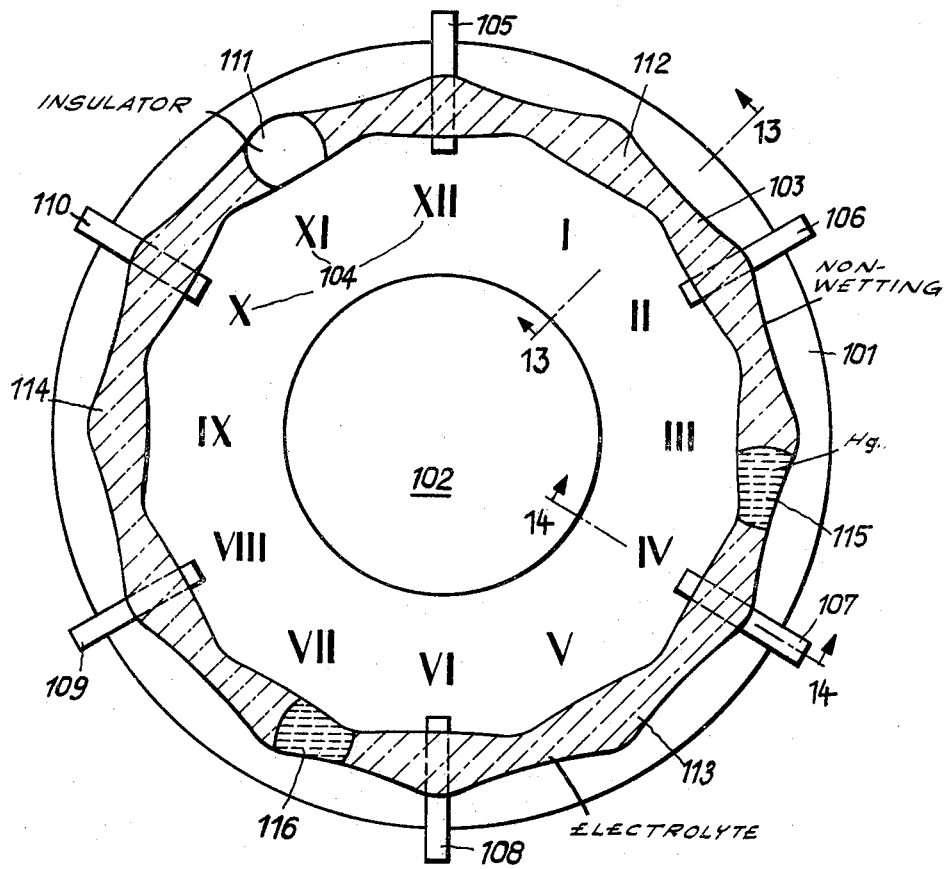
Fig. 12.
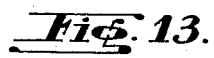
Fig. 13. Fig. 14.

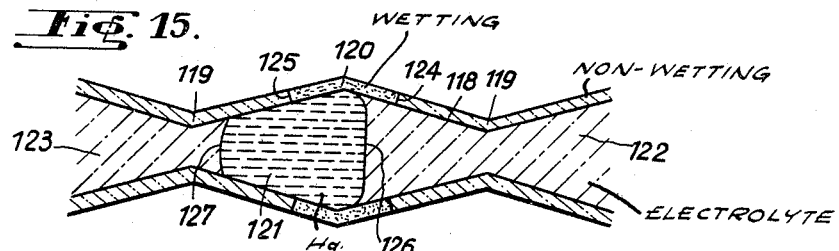
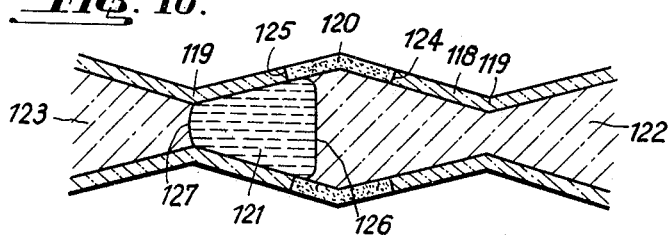
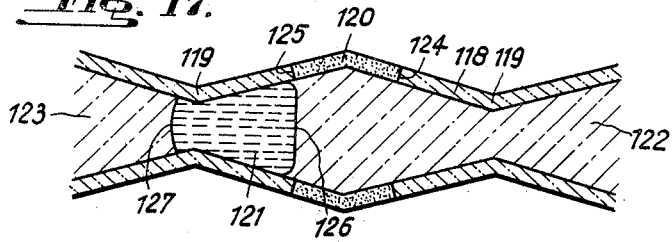
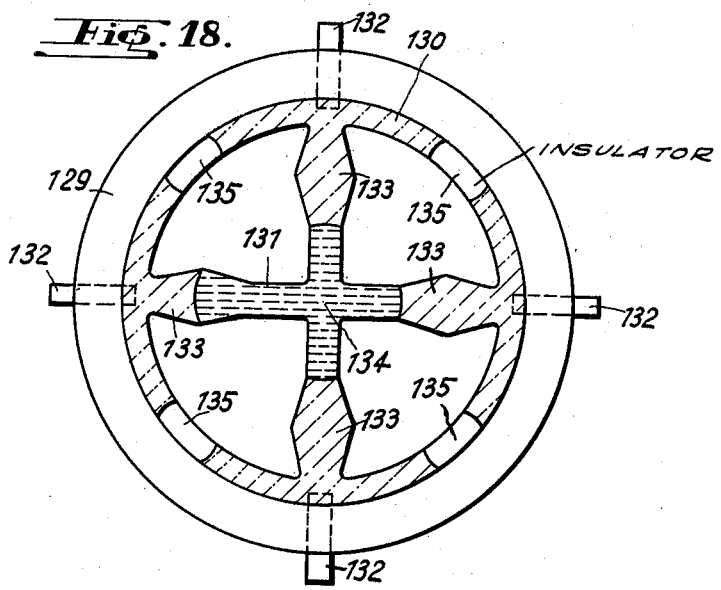

3,486,109
INDICATING DEVICE FOR LOW ENERGY ELECTRIC SIGNALS, COMPRISING CONDUCTING LIQUIDS
Eberhardt Schmidt, Bern, Switzerland, assignor to Centre Electronique Horloger S.A., Neuchatel, Switzerland, a Swiss company
Filed June 16, 1967, Ser. No. 646,560
Claims priority, application Switzerland, Aug. 4, 1966, 11,244/66
Int. Cl. G01r 27/22, 11/00
U.S. Cl. 324—94
26 Claims

ABSTRACT OF THE DISCLOSURE

An indicating device for low energy electric signals wherein electrical voltages are applied to non-miscible liquids in such a manner that gravitational forces have no substantial influence on the device. More particularly, the electrical voltage to be indicated is applied to three liquids arranged in succession and separated from one another by two distinct phase limiting surfaces. The forces resulting from the superficial tension in one phase limiting surface is not compared to the force of gravitation but to forces resulting from the superficial tension in the other phase limiting surface.

---

The invention concerns a method for indicating weak electric signals, preferably derived from low frequency binary processes by applying the electrical voltage of the signals to electrically conducting non-miscible liquids, the mutual phase limiting surfaces of which undergo a change in superficial tension when polarized in the electrical field, and by establishing a new position of equilibrium, corresponding to the modified superficial tension, of the liquids. In addition, the invention concerns a device for carrying out this method, as well as the utilization of the device in a watch to indicate the electric time signals.

A device known as a "capillary electrometer" has already been proposed, which comprises an at least partially transparent vessel, which is at least partially filled with mutually stratified electrically conducting liquids, and into which at least two electrodes protrude. This device serves to carry out the aforesaid method. The vessel of the capillary electrometer is partly filled with mercury and partly with an aqueous electrolyte solution, which entirely wets the wall of the vessel.

The superficial tensions in the phase limiting surfaces between the electrolyte phase and the mercury give rise to forces which are in equilibrium with the forces resulting from gravitation in the liquids, and are effective to determine the external shape of the two liquid phases.

Now the vessel of the capillary electrometer is conceived in such a manner that the superficial tensions in the phase limiting surface between the mercury phase and the electrolyte phase have a considerable influence on the shape of the mercury phase and that a change in the superficial tension results in considerable and easily visible change in the shape of the mercury phase. According to the known method, the electric voltage which is to be indicated is applied by means of two electrodes respectively in the mercury phase and in the electrolyte phase to the phase limiting surface, which owing to this undergoes a change in polarization and simultaneously a change in superficial tension.

The known method has the disadvantage of being of limited application only, owing to the fact that the gravitational forces acting on the liquids have a considerable influence on the precision of the indication and thus impose considerable limitations on the constructive conception of the capillary electrometer. The capillary electrometer itself has in particular the disadvantage that it is sensitive to changes in position, and owing to this fact amongst others has up to now only found a use in the laboratory.

The purpose of the present invention is to eliminate the aforesaid disadvantages of the known method and of the capillary electrometer and to provide a method for the indication of weak electric signals in which the gravitational forces no longer have any substantial influence on the indication. In particular, a device for carrying out the method is to be provided, which is simple in construction and can be produced economically, is reliable in operation and can be used in any position. In addition, the purpose of the invention is to provide an indicating device for an electric watch, in particular a small electric watch having only a slight consumption of energy.

Starting out from the known method, the aforesaid problem is solved by applying the electric voltage of the signals to three liquids arranged in succession and separated from one another by two distinct phase limiting surfaces. In this way superficial tensions of different values arise in the two different phase limiting surfaces which result in forces of different values arising in the electrically conducting liquids. A given position of equilibrium of the liquids can be made to correspond to these forces and thus be made to serve as a measure for the electric voltage applied.

Thus in the method according to the invention, the forces resulting from the superficial tension in one phase limiting surface are no longer compared to the force of gravitation but to forces resulting from the superficial tension in a further phase limiting surface.

The device according to the invention for carrying out the method, comprising an at least partially transparent vessel, which is at least partially filled with mutually stratified electrically conducting liquids and into which at least two electrodes protrude, is characterized in that the vessel contains at least three liquid phases arranged in succession and separated from one another by two phase limiting surfaces, and in that in addition a part of the internal surface of the vessel which is in contact with the intermediate liquid phase has non-wetting properties and that the two electrodes are connected to the two liquid phases which are separated from one another by the intermediate liquid phase. A non-wetting property of the surface is the property of this surface, depending on the material or the structure of the material, not to be wetted by the liquids contained in the vessel.

According to the invention, the intermediate one of the three liquid phases is contiguous the non-wetting part of the internal surface of the vessel and thus completely separates the two outer liquid phases from one another. Owing to the non-wetting property of the surface it is impossible for a molecular liquid film of a different composition to form between the intermediate liquid phase and the surface, and thus there effectively exist between the three liquid phases' two phase limiting surfaces which are entirely distinct from one another.

A particularly advantageous arrangement of the device according to the invention is one in which the liquids and the phase limiting surfaces between them are disposed to slide longitudinally in relation to the vessel, and in which, in addition, in at least one part, the internal surface of the vessel comprises a zone having non-wetting properties bounded by two phase limiting surfaces between the liquids, whilst the remaining parts of the surface have wetting properties in relation to the two liquid phases flanking the intermediate liquid phase, and the intermediate liquid phase is of greater extent in the longitudinal direction than this non-wetting zone.

In another form of the device according to the invention which is particularly advantageous for many applications, the liquids and the phase limiting surfaces between them are arranged to slide in the longitudinal direction in relation to the vessel, and at one point of the vessel at least the cross section of the internal space varies in relation to the longitudinal direction. The device according to the invention can comprise the two last-named arrangements either singly or in combination with one another. When, in such an arrangement, the liquids are displaced in relation to the vessel, the size of the phase limiting surfaces changes, which implies an exchange of energy. The liquids move automatically under the influence of the different superficial tensions as long as the balance of the exchange of energy is positive in the sense of mechanical energy. The magnitude of the force tending to move the liquids in a given direction depends on the magnitude of the voltage applied to the electrodes, and according to a further development of the idea of the invention elastic elements are provided, in particular in the device described, which impose on the liquid phases a position of equilibrium corresponding to the electric voltage.

The invention also includes a device in which there are only two mutually stratified electrically conducting liquids arranged to be able to slide in the longitudinal direction in relation to a vessel, in which at least one point of the vessel the cross section of the internal space varies in relation to the longitudinal direction and in which the vessel comprises elastic elements which impose on the liquid phases a position of equilibrium corresponding to the electric voltage. Thus this constitutes an arrangement derived from the capillary electrometer in which resilient forces replace the gravitational forces.

Further detail of the invention will be explained at greater length in the following description of various embodiments with reference to the accompanying drawings.

In the drawings:

FIGURES 1 and 2 illustrate a device in which liquids can take up two different positions of equilibrium corresponding to two different electrical signals.

FIGURES 3 to 5 illustrate a further embodiment of the device according to the invention, in which liquids can take up three positions of equilibrium corresponding to three different electrical signals.

FIGURE 6 illustrates a further embodiment of the device according to the invention.

FIGURE 7 illustrates an embodiment derived from the device according to FIGURES 3 to 5.

FIGURES 8 and 9 illustrate a device for indicating the electric time signals of a watch.

FIGURE 10 illustrates another device for indicating the electric time signals of a watch.

FIGURE 11 is a partial sectional view of a device with an advantageously designed arrangement of the electrodes in capillary channels.

FIGURE 12 shows a cross-section of an embodiment of the device according to the invention for indicating the time signal of a watch.

FIGURES 13 and 14 are sectional views of the device according to FIGURE 1 taken along the lines 13—13 and 14—14.

FIGURES 15 to 17 are partial sectional views of a device according to the invention in a modified embodiment showing various positions of the liquid phases in the internal space of the vessel for various states of polarization.

FIGURE 18 is a sectional view of a further embodiment of the device according to the invention to indicate the time signals of a watch.

Figure 19:
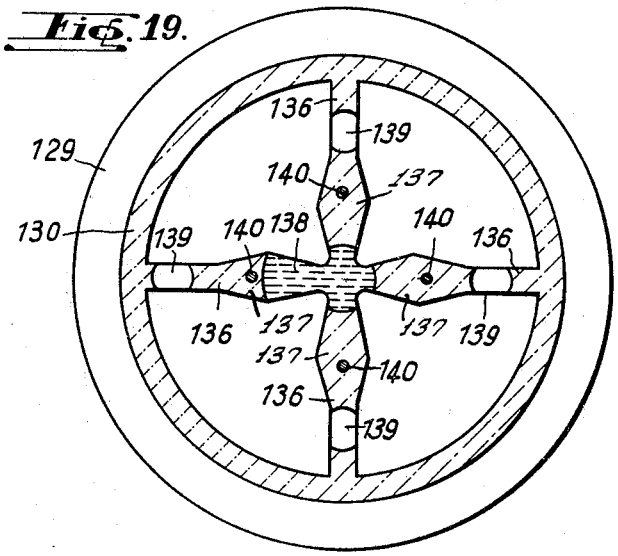
Figure 20:
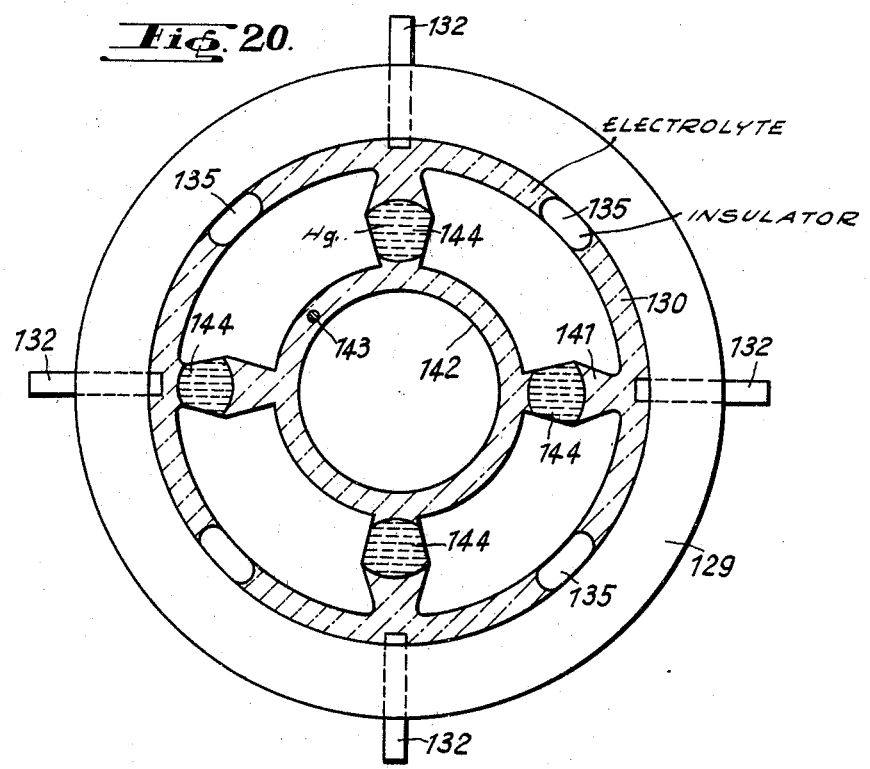

FIGURE 19 is a sectional view of a modification of the embodiment of the device according to the invention shown in FIGURE 18, and FIGURE 20 is a sectional view of a further modification of the embodiment of the device according to the invention shown in FIGURE 18.

All the figures are principally schematic views, the scale being considerably distorted. In all the figures similar parts are indicated by the same numeral.

FIGURES 1 and 2 of the drawings illustrate the simplest embodiment of the device according to the invention. This embodiment comprises a transparent capillary tube 1, which is for instance made of glass, in each of the open ends of which an electrode 2 respectively 3, projects. The capillary tube 1 contains an aqueous electrolyte solution in a first electrolyte phase 4, and in addition liquid mercury in a mercury phase 5, and a further aqueous electrolyte solution in a second electrolyte phase 6. The internal surface of the capillary tube 1 has non-wetting properties in an annular closed zone 7, whilst the remaining parts of the surface have wetting properties.

In the FIGURES 1 and 2 the non-wetting zone 7 is shown as if in its range the capillary tube 1 were made of a different material than that in the ranges of the zones with wetting properties. This manner of representation has also proved to be particularly appropriate and clear in the case of all the other figures. In the manufacture of vessels having alternately wetting and non-wetting surfaces, however, it is not necessary to make use of different materials; on the contrary by means of a special superficial treatment it is possible to obtain non-wetting surfaces on normally wetting surfaces or reciprocity to obtain wetting surfaces on normally non-wetting surfaces. In the glass capillary tube 1 of the device of the FIGURES 1 and 2, the surface of which is normally wetting in relation to aqueous electrolyte solutions the non-wetting zone 7 may for instance be obtained by applying a thin silicone coating on the otherwise wetting surface.

In the device illustrated in FIGURES 1 and 2, the mercury phase 5 extends in the capillary tube 1 beyond the non-wetting zone 7 and is in contact with the inner surface of the capillary tube only in the range of the non-wetting zone, whilst in the other ranges the electrolyte phases 4 and 6 form thin intermediate films of molecular extent which separate the mercury phase from the inner surface of the capillary tube. The phase limiting surfaces between the mercury phase 5 on the one hand and the two electrolyte phases 4 and 6 on the other thus each extend up to an outer edge of the non-wetting zone 7. Accordingly, when the liquid phases are displaced in the capillary tube, the one phase limiting surface increases in size, whilst the other phase limiting surface becomes smaller.

In FIGURE 1 of the drawings the position of the liquid phases is such that the phase limiting surface, indicated by the numeral 8, between the mercury phase 5 and the electrolyte phase 6 has reached a minimum, whilst in FIGURE 2 the illustrated position of the liquids is such that the phase limiting surface, indicated by the numeral 9, between the mercury phase 5 and the electrolyte phase 4 is at its smallest. The position of the liquids according to FIGURE 1 corresponds to a stable state of equilibrium between the forces in the liquid phases when the superficial tension in the phase limiting surface 8 is larger than the superficial tension in the phase limiting surface 9. Reciprocally, the liquid phases take up the positions shown in FIGURE 2 when the surface tension in the phase limiting surface 9 is higher than the surface tension in the phase limiting surface 8.

The two electrodes 2 and 3 are constituted by appropriately pre-treated cylindrical metal rods which constantly project into the two electrolyte phases 2 and 3 for all positions of the liquids. Owing to their cylindrical shape and to their symmetrical arrangement in the capillary tube 1, the electrodes 2 and 3 have no influence on the position of the liquid phases in the capillary tube.

The numeral 10 indicates a source of signals, which, in the drawings is shown as a voltage source which can emit variable electrical signals. This source of signals 10 is connected to the electrodes 2 and 3 to which it transmits electric voltages, which according to FIGURES 1 and 2 are of opposite signs. A voltage applied to the electrodes 2 and 3 produces different degrees of polarization at the phase limiting surfaces 8 and 9, with the result that different superficial tensions arise in the phase limiting surfaces, and the liquid phases move to one or the other of the positions of equilibrium illustrated in FIGURES 1 and 2.

If the electrolyte phases 4 and 6 have the same composition, so that the device according to FIGURES 1 and 2 is entirely symmetrical in arrangement, all the forces acting on the liquids in the horizontally disposed capillary tube 1 are in equilibrium with one another independently of the position of the liquids in the capillary tube, as long as the electrodes 2 and 3 are externally short-circuited.

In certain cases however, it is desirable to maintain a constant polarization of the phase limiting surfaces 8 and 9 in relation to one another, by means of which a given position of equilibrium of the liquids is determined, even though no electric voltage is being applied to the electrodes 2 and 3. An initial polarization of the two phase limiting surfaces in the device according to FIGURES 1 and 2 exists when the aqueous electrolyte solutions of the two electrolyte phases 4 and 6 have different compositions. Here the meaning of different compositions is to be taken as meaning that there are different ion concentrations or different kinds of ions or the two simultaneously in the water.

In the device according to FIGURES 1 and 2 the gas pressure acting on the two sides of the liquid phases has no influence on the position of equilibrium of the liquids, because the capillary tube 1 is open to the atmosphere and because this atmosphere produces an invariable pressure even though the liquids are moved. But the gas pressure acting on both sides of the electrolyte phases 4 and 6 could also be used to obtain a further position of equilibrium, as illustrated for instance in FIGURE 7 of the drawings.

Up to now tests have shown that it is particularly appropriate to form a chain of the kind silver-silver halide electrode/alkali halide/mercury/alkali halide/silver halide electrode in the device according to the invention.

The modes of operation and the possibilities of particular arrangements of the device according to the invention and its adaptation to the conditions of given applications described in detail in the case of the embodiment of FIGURES 1 and 2 are also given in the case of the devices according to FIGURES 3 to 11, so that they will not be referred to again.

The FIGURES 3 to 5 illustrate a further embodiment of the device according to the invention, in which a mercury phase 11, two electrolyte phases 12 and 13, as well as a so-called insulating phase 14 are contained in a ring-shaped vessel 15. Electrodes 16 and 17, which are connected to a source of signals 18 project into the electrolyte phases 12 and 13. A part of the vessel 15 is formed by a capillary tube 19, the middle part of which has a relatively large cross-section and which becomes narrower in the two longitudinal directions. The internal space bounded by the capillary tube 19 can, for instance be in the shape of a double cone or in the shape of a double rotation paraboloid. Another part of the vessel 15 consists in a connecting duct 20, through which liquid can flow from one end of the capillary tube to the other when the liquid phases are displaced in the capillary tube 19. The insulating phase 14 is there to prevent the short-circuiting of electric current from the electrode 16 to electrode 17 through the connecting duct. The insulating phase 14 can consist in a bubble of gas, as long as the inner surface of the connecting duct 20 has non-wetting properties so that the electrolyte liquids of the electrolyte phases 13 and 14 cannot form electrically conducting films on the said surface in the neighbourhood of the gas bubble. The insulating phase 14 could also, however be formed by an insulating liquid, for instance benzol.

When the inner surface of the capillary tube 19 is entirely non-wetting, it is immediately adjacent to the phase limiting surface, indicated by the numeral 21, between the mercury phase 11 and the electrolyte phase 13 on the one hand, as well as to the phase limiting surface, indicated by the numeral 22, between the mercury phase 11 and the electrolyte phase 12 on the other.

As long as the phase limiting surfaces 21 and 22 are not polarized, i.e. as long as an electric voltage having the value zero is applied to the electrodes 16 and 17, the liquid phases will generally take up the position of equilibrium illustrated in FIGURE 4, in which the mercury phase 11, owing to its position in the central part of the capillary tube 19 will have the smallest total superficial surface. If the mercury phase 11 is now moved from the position illustrated in FIGURE 4 in one of the longitudinal directions of the capillary tube 19, the electrolyte phases 12 and 13 are of course moved at the same time, and the sizes of the two phase limiting surfaces 21 and 22 change in opposition just as the phase limiting surfaces 8 and 9 do when the liquid phases move in relation to the capillary tube 1 of the device according to FIGURES 1 and 2.

Thus, when the phase limiting surfaces 21 and 22 are differently polarized by the application of an electric voltage to the electrodes 16 and 17, the liquid phases 11–13 as well as the insulating phase 14 move automatically away from the middle position illustrated in FIGURE 4 as long as mechanical energy is liberated owing to the change in size of the totality of the phase limiting surfaces.

If, for instance, as according to FIGURES 3–5, the internal space bounded by the capillary tube 19 is in the shape of a double cone, the cross-section of this capillary tube varies in the longitudinal direction according to a quadratic function. When, this being the case, the liquid phases 11–13 are moved in one direction from the middle position illustrated in FIGURE 4, for instance towards the electrode 16, the phase limiting surface 22 will suffer a change in size which becomes gradually lesser than that of the phase limiting surface 21, and as the exchange of energy in the phase limiting surfaces is proportional to the variation of the surface and to the superficial tension, the liquid phases will take up a position of equilibrium depending on the difference between the superficial tensions in the two phase limiting surfaces. The positions of equilibrium of the liquid phases 11–13 and of the insulating phase 14 are thus functions of the voltages applied to the electrodes 16 and 17. In the case of the dimensions of the mercury phase 11 illustrated in FIGURES 3–5 this latter does not, however move independently of the electric voltage applied, any further than the point at which one of the phase limiting surfaces, for instance the phase limiting surface 22 in FIGURE 3 attains a minimum value.

In the case of the device according to FIGURE 6 a capillary tube 23 ends in two vessels 24 and 25 having enlarged cross-sections, in each of which projects an electrode 26, respectively 27. Owing to the enlarged cross-section of the vessels 24 and 25 the electrodes 26 and 27 offer no undesirable resistance to flow. A connecting duct 28 between the vessels 24 and 25 serves to equalize pressure and quantity when an electrolyte phase 29, a mercury phase 30, a further electrolyte phase 31 and an insulating phase 32 are displaced.

The internal surface of the casing composed of the parts 23, 24, 25 and 28 has wetting properties in relation to the electrolyte phases 29 and 31. There are only two non-wetting zones 33 and 34, of which the zone 33 determines two positions of equilibrium of the liquid phases when voltage signals are applied to the electrodes 26 and 27, whilst the zone 34 prevents an electrically conducting connection of the electrolyte phases 29 and 31 in the region of the insulating phase 32.

In the device according to the invention illustrated in FIGURE 7 of the drawings, a capillary tube 35 is in communication at both ends with closed vessels 36 and 37. Into the vessels 36 and 37 project electrodes 38 and 39, which in turn may be connected to a source of signals 40. The internal surface of a double cone shaped part 41 of the capillary tube 35 is non-wetting in relation to an electrolyte phase 42, a mercury phase 43 and a further electrolyte phase 44. A gas cushion 45, respectively 46, is arranged above each of the electrolyte phases 42 and 44, these cushions acting resiliently on the liquid phases 42–44. When the phase limiting surfaces between the mercury phase 43 on the one hand and the electrolyte phases 42 and 44 on the other are polarized forces arise in these liquid phases which cause the liquid phases to be displaced against the resilient forces in the gas cushions 45 and 46. The extent of the displacement is dependent on the electric voltage applied. When the electric voltage is zero, the liquid phases take up an intermediate position of equilibrium depending on the pressures existing in the gas cushions.

FIGURE 8 illustrates a device by means of which a total of four signals can be indicated. It is however easy to see that owing to the circular symmetry of this device, it could be enlarged by multiplying certain individual components, to indicate, for instance, the twelve signals of a watch. The particular characteristic of the device according to FIGURE 8 is the star-shaped arrangement of the capillary tubes 47–50, which are connected together in the centre and the outer ends of which are in communication through an annular duct 51. The internal surfaces of the capillary tubes 47–50 form in the neighbourhood of the centre of the star a non-wetting zone 52 and the annular duct 51 also has non-wetting zones 53 situated between the points of connection of the capillary tubes in the range of each of which is movably disposed a gas bubble or an insulating liquid forming a so-called insulating phase 54.

In the region of the centre of the star the capillary tubes 47–50 enclose a mercury phase 55, which extends in one at least of the capillary tubes beyond the non-wetting zone 52. The remaining spaces of the capillary tubes 47–50 and of the annular duct 51 are filled with an aqueous electrolyte solution, which forms four electrolyte phases 56–59, which are completely separated from one another, between the mercury phase 55 and the insulating phases 54. Electrodes 60–63 project into the electrolyte phases 56–59, which, depending on the signal to be indicated, are connected the one, for instance the electrode 63 to one pole of a voltage source 64 whilst all the remaining electrodes are simultaneously connected to the other pole.

If, for instance, according to FIGURE 8, the electric voltage is applied to the electrode 63 on the one hand and to the electrodes 60–62 on the other, different polarizations occur at the phase limiting surface between the electrolyte phase 59 and the mercury phase 55 on the one hand and on the other at the three further phase limiting surfaces between the mercury phase 55 and the electrolyte phases 56–58. Owing to a corresponding change of the superficial tensions in the phase limiting surfaces the mercury of the mercury phase 55 is driven out of the capillary tubes 47–49 until the corresponding phase limiting surfaces reach the non-wetting zone 52. The mercury which has been driven out flows outwardly in the capillary tube 50 and could for instance form in this tube the indication of the time signal nine o'clock.

According to the representation according to FIGURE 9, an outer mask 65 masks in particular the annular duct 51 and an inner mask 66 masks in particular the non-wetting zone 52 of the device according to FIGURE 8. Owing to these masks, all that can be seen outwardly of the device according to FIGURE 8 are parts of the capillary tubes 47–50 as well as a part of the mercury phase 55 in one of the capillary tube, for instance in the capillary tube 50. In the case of application of the device to a watch one of the two masks, for instance the outer mask 65, appropriately forms at the same time the dial.

The device according to FIGURE 10 of the drawings, comprises in particular a ring-shaped closed capillary tube 67 into which project a total of six electrodes 68–73 evenly spaced around the ring. For practical reasons the electrodes should not cause an increase or a reduction of the cross-section inside the capillary tube 67. In the capillary tube 67 are disposed a gas bubble or an insulating liquid forming a so-called insulating phase 74, as well as two mercury phases 75 and 76 and three electrolyte phases 77–79 which are separated from one another.

The capillary tube 67 may be made of glass, the surface of which normally has wetting properties in relation to the aqueous solutions of the electrolyte phases 77–79. The internal surface of the capillary tube is however provided with twelve non-wetting zones 80 evenly spaced around the circumference of the ring, and the extent of which in the circular direction is less than that of the mercury phases 75 and 76.

In order that the device according to FIGURE 10 may operate correctly, it is important that the electrolyte phase 78 separating the mercury phases 75 and 76 should exactly take up in the capillary tube 67 the length which considered in a certain direction, is determined by the forward edge of one non-wetting zone 80 and the rear edge of another non-wetting zone 80. In other words, the length of the electrolyte phase 78 should be equal to a whole multiple of the total length of the capillary tube 67 divided by the number of wetting zones less the length of a non-wetting zone 80. In the case of the device according to FIGURE 10 the electrolyte phase 78 occupies a third of the length of the capillary tube 67 less the length of a non-wetting zone 80. The length of each of the two mercury phases 75 and 76, less the length of a non-wetting zone 80, must, provided all the non-wetting zones have identical lengths, be at least equal to the circumference of the capillary tube 67 divided by double the number of the non-wetting zones.

In order to describe the operation of the device according to FIGURE 10, it is supposed that the liquid phases are to be moved clockwise forward in relation to the capillary tube 67. If accordingly, an electric voltage of corresponding direction is applied to the electrodes 71 and 73, then, according to the already repeatedly described mode of operation, the mercury phase 75 will be driven forward until the phase limiting surface between the mercury phase 75 and the electrolyte phase 77 has been reduced to a minimum. Driven by the mercury phase 75 the insulating phase 74 and the other liquid phases 76–79 are also moved forward in a circle. The mercury phase 76 will thus be driven out of the range of the one non-wetting phase 80 and reaches, seen in the clockwise direction, the next non-wetting zone 80 with its front edge. After this the electric voltage is applied in the same direction to the electrodes 73 and 69, so that now the mercury phase 76 moves forward clockwise until the phase limiting surface between the mercury phase 76 and the electrolyte phase 78 reaches a minimum. Thus, by means of the measures described here, the mercury phases 75 and 76 as well as all the remaining liquid phases are moved each time through an angle of thirty degrees along a circular path.

It is appropriate to apply the voltage to those of the electrodes 68–73 which are connected to one of the electrolyte phases 77–79 during one motion process. In addition, it is advantageous to short-circuit amongst themselves those electrodes to which no voltage is applied in such a manner that no polarizations may occur which would hinder the motion of the liquid phases. If this fact is observed the above described measures can be repeated as many times as desired and the liquid phases can be moved around in a circle.

For the indication of time signals in a watch it is necessary to provide an indicating surface of good visibility. Such a surface can be for instance constituted by the insulating phase 74, which should offer a colour contrast in relation to the electrolyte phases 77 and 79. If the insulating phase is formed by a liquid, it may be appropriate to give to this liquid a strong colouring.

It may be expected that, in the case of the device according to FIGURE 10, the mercury phases may form an amalgam with the metallic electrodes with which they come in contact, and this may eventually make the device useless. FIGURE 11 illustrates a capillary tube 81 which is separated from an electrode 83 by a recess 82. Owing to the relatively high superficial tension, a mercury phase 84 cannot penetrate into the recess 82, whilst either the nature of the surface or the dimensions of the recess make it possible for the electrolyte phase 85 to establish a contact with the electrode 83.

The device according to FIGURES 12 to 14 comprises a circular plate 101 provided with a central opening 102. The surface of the plate 101 is provided with an annular shaped closed groove 103 the cross-section of which changes twelve times. Watch ciphers 104 corresponding to certain cross-sections of the groove are arranged on the plate. The groove 103 as well as the ciphers 104 can for instance be etched, engraved or pressed in the surface of the plate 101. Six electrodes 105–110 which are regularly spaced around the periphery are let into the plate 101 and extend into the region of the groove 103. The groove 103 is filled with an electrically insulating liquid, forming an insulating phase 111, with electrolyte liquid forming three separate electrolyte phases 112–114 and with mercury in two separate mercury phases 115 and 116. The surface of the groove 103 has non-wetting properties in relation to the liquids of these various phases. The groove 103 is covered by a covering plate 117 which forms a liquid tight joint with the plate 101. At least one of the plates should be made of transparent material, for instance of transparent plastic material the surface of which, without requiring any particular treatment has non-wetting properties in relation to the liquids contained in the groove.

If, for instance, an appropriate voltage is applied to the electrodes 106 and 108, the mercury phase 115 moves clockwise owing to the forces arising from polarization acting on its phase limiting surfaces until the phase limiting surface between this mercury phase 115 and the electrolyte phase 113 reaches a minimum value. The other liquid phases are also driven round the annular shaped groove 103 by the mercury phase 115. The electrolyte phase 113 and the mercury phase 116 must be dimensioned in such a manner that the phase limiting surface between the mercury phase 116 and the electrolyte phase 114—seen in the clockwise direction—is already situated beyond a point of the groove 103 the cross-section of which is of maximum value, as soon as the phase limiting surface between the mercury phase 115 and the electrolyte phase 113 has reached a point of the groove 103 where the cross-section is of minimum value. FIGURE 12 illustrates such a position of the liquid phases which may be obtained for instance by applying a corresponding electric voltage to the electrodes 106 and 108. If the same electric voltage is now applied for instance to the electrodes 108 and 110, the forces resulting from the superficial tensions in the phase limiting surfaces of the mercury phase 116 drive the liquid phases further round in the clockwise direction. The measures described here thus moved the liquid phases along a circular path through an angle of 30 degrees.

The part of a capillary tube 118 shown by the FIGURES 15 to 17 has restricted points 119 as well as points 120 having a maximum cross-section and is filled with a mercury phase 121 as well as with electrolyte liquid forming two separate electrolyte phases 122 and 123. The capillary tube 118 has non-wetting properties in relation to the said liquids excepting that it comprises in the region of maximum cross-section an annular zone which has wetting properties in relation to the electrolyte phases 122 and 123, and the zone limits of which are indicated by the ciphers 124 and 125. The various liquid phases 121 to 123 form two phase limiting surfaces 126 and 127 between the mercury on the one hand and the electrolyte phases on the other.

When the phase limiting surfaces 126 and 127 are appropriately polarized, they move in the longitudinal direction towards the left in relation to the capillary tube 118 under the influence of the superficial tensions acting in them. As soon, however, as the phase limiting surface 126 has moved beyond the zone limit 124, as illustrated in FIGURE 15, it suddenly increases, without energy being exchanged, to the size of the wetting annular zone. At the same time the functional relation between the position of the mercury phase 121 and the size of the phase limiting surface 126 also changes. Owing to this, it is possible that, the polarization of the phase limiting surfaces remaining the same, the mercury phase 121 will not remain in the position illustrated in FIGURE 15, but will move to one or the other of the positions of equilibrium illustrated in FIGURES 16 or 17. In the position of equilibrium illustrated in FIGURE 17, the phase limiting surface 127 has then already moved beyond the restricted point 119.

If now, in the position illustrated in FIGURE 17, the polarization of the phase limiting surfaces is changed, the mercury phase 121 continues to move towards the left until the phase limiting surface 126 reaches the restricted point 119. A further movement in the longitudinal direction towards the left then occurs, when the polarization of the phase limiting surfaces disappears and the mercury phase 121 tends to reduce its outer surface to a minimum. This minimum is reached as soon as the mercury phase is situated in the region of a point 120 having a maximum cross-section.

If therefore the capillary tube 118 is continued in a constantly repeated conformation such as that illustrated in the FIGURES 15 to 17, then it is possible to cause the mercury phase 121 to be driven forward stepwise at will in this capillary tube by constantly changing the state of polarization in the phase limiting surfaces 126 and 127. Of course the capillary tube 118, in its lengthened form, may be closed to form an annulus and thus be transformed into a device such as that illustrated in FIGURES 12 to 14. This device then comprises only one mercury phase, two electrolyte phases and an insulating phase inserted between them, and is particularly suitable for indicating the electric signals of a watch.

It is to be noted here that besides the polarizations, it is solely the conformation of the space placed at the disposal of the liquids which determines the position of equilibrium of the liquids. Thus, if a given position of equilibrium has to be imposed on the liquids, it may be appropriate to determine the conformation of the space placed at the disposal of the liquids by means of electrodes having a particular conformation.

In the embodiment of the invention illustrated in FIGURE 18, a component preferably composed of plates of plastic material which comprises a base plate 129, is provided with an annular shaped capillary duct 130 as well as with capillary ducts 131 connected together in the form of a cross. The ducts 131 open into the annular shaped duct 130. When the device according to the invention is used in a watch it is preferably provided with at least twelve capillary ducts 131 mutually arranged crosswise, whilst in FIGURE 18, for greater clarity, only four such ducts are shown.

Each duct 131 is provided with an electrode 132 in the fashion illustrated. Each duct 131 is provided immediately before the point of opening into the annular shaped duct 130 with a zone 133 the cross-section of which first increases and then decreases. The central point of junction of the ducts 131 is filled with mercury to such an extent that the same reaches into the zones 133 and partially fills these. Movable insulating means 135 separate the openings of the ducts 131 in the annular shaped duct 130.

The insulating means can be for instance, gas bubbles or drops of an electrically insulating liquid. The space remaining in the capillary ducts 130 and 131 is filled with one or more electrolyte liquids.

The operation of the device according to FIGURE 18 can be understood without further explanation. If, for instance, the electrode 132 on the left side of FIGURE 18 is polarized with the correct sign in relation to all the other electrodes, the mercury 134 moves towards the left at least partially into the zone 133 of the corresponding duct 131 and thus indicates the state of polarization of the corresponding electrode in relation to the other electrodes.

The embodiment according to FIGURE 19 of the drawings differs from the one illustrated in FIGURE 18 solely by the shape of the capillary ducts connected starwise together and which are indicated in FIGURE 19 by the cipher 136. These ducts are provided immediately adjacent the centre of the star with zones 137 the cross-section of which first increases and then decreases, and which correspond in function and shape to the zones 133 of the embodiment according to FIGURE 18. The ducts 136 are filled at the centre of the star with mercury. In addition, each duct 136 contains just before the opening into the annular shaped channel 130 an insulating means 139 and in the direction of the centre of the star, before the insulating means 139, an electrode 140. The operation of the device according to FIGURE 19 is not different in principle from that of the device according to FIGURE 18.

The device according to FIGURE 20 of the drawings differs from that according to FIGURE 18 principally by the fact that the capillary ducts 141 converging starwise together open into a further annular shaped duct 142. An electrode 143 is situated in this duct 142. Each of the ducts 141 comprises an increase in cross-section and a decrease in cross-section and is partially filled with mercury 144. For the rest similar parts in FIGURE 20 are indicated in the same way as in FIGURE 18.

The electric voltage between one of the electrodes 132 and the totality of the other electrodes 132 as well as the electric voltage between one of the electrodes 132 and the electrode 143 can be made visible in the device according to FIGURE 20.

Owing to the fact that in the devices according to FIGURES 18 to 20, when the mercury is moved all the other liquids move also, it may be left to the man of the art to decide whether he prefers to use the mercury as indicating means or would rather for instance, make use of the insulating means as indicating means. When the insulating means are constituted by droplets of a liquid, it may be indicated to give them a contrasting colouring and to use them as indicating means. In particular when used in watches the devices according to FIGURES 18 to 20 are provided with a covering with the exception of the regions in which the indicating means move.

All the devices according to the invention are preferably hermetically sealed. If they are subjected to large differences in temperature, the liquids will expand in the capillary ducts. Therefore, according to a particular further development of the idea of the invention, the internal spaces of the vessel, respectively the capillary ducts should either be at least partially formed with resilient walls or they should communicate with at least one expansion space. This expansion space can in its turn be formed of resilient walls, or else it is under vacuum at medium temperatures and is filled with liquid at the highest permissible temperature. When the insulating means in the capillary ducts, respectively in the internal space of the vessel are consistuted by gas bubbles, the liquids are able to expand, the gas bubbles being compressed thereby.

I claim:

1. Device for indicating weak electric signals, preferably derived from low frequency binary processes, comprising an at least partially transparent vessel, which is at least partially filled with mutually stratified electrically conducting liquids and into which at least two electrodes protrude, said vessel containing at least three liquid phases arranged in succession and separated from one another by two phase limiting surfaces, and a part of the internal surface of the vessel which is in contact with the intermediate liquid phase having non-wetting properties, and the electrodes being connected to the two liquid phases which are separated from one another by the intermediate liquid phase.

2. Device according to claim 1, wherein the liquids and the phase limiting surfaces between them are arranged to slide in the longitudinal direction in relation to the vessel, at least one part of the internal surface of the vessel comprises a zone having non-wetting properties bounded by two phase limiting surfaces between the liquids, whilst the remaining part of the surface has wetting properties in relation to the two liquid phase flanking the intermediate liquid phase, and wherein the intermediate liquid phase is of greater extent in the longitudinal direction than this non-wetting zone.

3. Device according to claim 1, wherein the liquids and the phase limiting surfaces between them are arranged to slide in the longitudinal direction in relation to the vessel and wherein in at least one point of the vessel the cross-section of the internal space varies in dependence on the longitudinal direction.

4. Device according to claim 1, further comprising resilient elements disposed in the vessel outside the reach of said intermediate liquid phase, said resilient elements imposing on the liquid phases a position of equilibrium corresponding to the electric voltage.

5. Device according to claim 1, wherein the internal space of the vessel is filled partially with mercury and partially with electrolyte liquid.

6. Device according to claim 5, wherein the mercury and the electrolyte liquid are arranged to form a chain electrolyte liquid/mercury/electrolyte liquid.

7. Device according to claim 1, wherein the first liquid phase of the succession is an aqueous alkali halogenide solution and the current is applied by means of silver-silver halide electrodes.

8. Device according to claim 1, wherein the internal space of the vessel is partially filled with an electrically insulating liquid which has two distinct phase limiting surfaces in relation to the liquid phase of the succession.

9. Device according to claim 1, wherein the vessel comprises a cylindrical internal surface of which at least one cylindrical annular zone has the property of not being wetted by the liquids.

10. Device according to claim 1, wherein the vessel comprises a conical internal space the surface of which has the property, at least in given annular zones, not to be wetted by the liquids.

11. Device according to claim 10, wherein the internal space of the vessel is in the shape of a plurality of cones with mutually oppositely inclined angles of the cones.

12. Device according to claim 10, wherein the angle of the cone of the surface of the internal space preferably varies continuously along the axis of the cone.

13. Device according to claim 1, wherein the internal space of the vessel is substantially of capillary cross-section.

14. Device according to claim 1, wherein the internal space of the vessel forms a continuous annulus.

15. Device according to claim 14, wherein electrolyte liquid, mercury, electrolyte liquid and electrically insulating liquid separated by phase limits are arranged in the internal space of the vessel.

16. Device according to claim 1, wherein the sequence electrolyte liquid, mercury, electrolyte liquid separated by phase limits is present more than once in the internal space of the vessel.

17. Device according to claim 1, wherein the vessel is at least partially made of glass.

18. Device according to claim 1, wherein the vessel is at least partially made of a transparent material.

19. Device according to claim 1, wherein the vessel is composed of at least two inidividual parts, which form a joint in the internal surface of the vessel preferably in the longitudinal extent of the latter.

20. Device according to claim 19, wherein the internal space of the vessel comprises an engraved or etched groove in the surface of the joint.

21. Device according to claim 1, wherein the internal space of the vessel comprises at least one annular space which comprises parts preferably regularly spaced round the circumference, the cross-section of said parts increasing and then decreasing.

22. Device according to claim 21, wherein the internal space of the vessel is of closed annular shape and comprises points of restricted cross-section and points of increased cross-section preferably uniformly spaced around the circumference.

23. Device according to claim 22, wherein electrolyte liquid, mercury, electrolyte liquid and electrically insulating liquid separated from one another by phase limiting surfaces are disposed in the internal space of the vessel, and the internal surface of the vessel which otherwise has non-wetting properties comprises wetting annular zones in the regions of increased cross-section.

24. Device according to claim 22, wherein electrolyte liquid, mercury, electrolyte liquid, mercury, electrolyte liquid and electrically insulating liquid separated from one another by phase limiting surfaces are disposed in succession in the internal space of the vessel.

25. Device according to claim 23, wherein star shaped ducts preferably uniformly spaced around the circumference open into the annular space, are in their turn connected to one another and each comprises a point of increased cross-section and a point of restricted cross-section.

26. Device according to claim 21, wherein the internal space of the vessel is limited at least partly by expandable material.

References Cited

UNITED STATES PATENTS

| | | | |
|---|---|---|---|
| 2,946,954 | 7/1960 | Fitch | 324—93 X |
| 3,343,083 | 9/1967 | Beusman | 324—94 |
| 3,349,326 | 10/1967 | Hyman et al. | 324—94 |

WILLIAM F. LINDQUIST, Primary Examiner

C. F. ROBERTS, Assistant Examiner

U.S. Cl. X.R.

324—68